March 17, 1970  T. P. O'DONNELL  3,500,769

WRITING PLATFORM COMPRISING A CONTAINER ELEMENT

Filed Sept. 15, 1967

INVENTOR.
THOMAS P. O'DONNELL

United States Patent Office 3,500,769
Patented Mar. 17, 1970

3,500,769
WRITING PLATFORM COMPRISING A
CONTAINER ELEMENT
Thomas P. O'Donnell, 220 Highland Blvd.,
Brooklyn, N.Y. 11207
Filed Sept. 15, 1967, Ser. No. 667,932
Int. Cl. A47b *41/06*
U.S. Cl. 108—25         3 Claims

ABSTRACT OF THE DISCLOSURE

A writing platform base with walls of a container element projecting upwardly therefrom and into said container element's top wall which marginally overlies said walls and has an opening therethrough for removably inserting a sheet of paper therethrough and on top of said base within said container element for a purpose that said sheet of paper is margined by said top wall and exposed through said opening therethrough. Each modification shows an end portion of a said container element is without a wall thereby disposing itself thereat for removably inserting a sheet of paper therethrough and into said container element, for a said purpose.

SUMMARY

Figure 1:
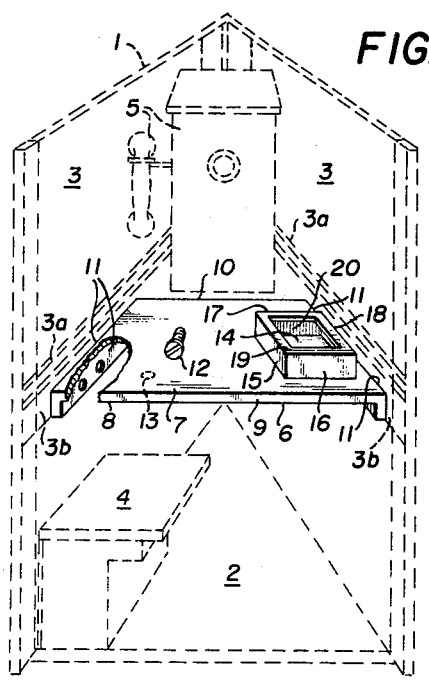

In an article of manufacture, this invention and each modification thereof relates to a new, novel and useful writing platform base comprising a container element projecting upwardly therefrom. Said invention writing platform comprises a base, and said container element comprises a spaced apart and parallel extending pair of side walls projecting upwardly from said base, and an end wall projecting upwardly from said base and connecting said pair of side walls and closing an end of said container element, and an opposite end wall projecting upwardly from said base and connecting said pair of side walls and closing an opposite end of said container element, and a top wall overlies overall said closed end and opposite end and pair of side walls, said top wall having an opening therethrough and leading down into said container element to a portion of said base of said writing platform therein. When said article is used, a single sheet of paper or a supply of sheets of paper layered flatwise one sheet on top of another can be fingerwisely handled and removably inserted through said opening through said top wall for laying flatwisely on top of a portion of said writing platform base at a bottom of said container element for a purpose that a margin portion of said sheet of paper or of a top sheet in said supply thereof can be positioned therein beneath for being margined by a portion of said top wall thereof as an interior portion of a said sheet of paper or of said top sheet in said supply thereof is exposed through said opening through said top wall of said container element for reading and writing characters thereon.

And a first modification shows a said writing platform comprising a base, and its container element comprising a spaced apart and parallel extending pair of side walls projecting upwardly from said base, and an end wall projecting upwardly from said base and connecting said pair of side walls and closing one end of said container element, and a top wall overlies overall said closed end and pair of side walls and also across a top of a paper insert opposite end thereof where please note there is not a wall and being said opposite to said closed one end of said container element, and said top wall having an opening therethrough and leading down into said container element to a portion of said base therein. In usage thereof, a sheet of paper or a said supply thereof can be fingerwisely handled and removably inserted through said not walled paper insert opposite end being said opposite to said closed one end of said container element for a purpose that a margin portion of a said sheet or of a top sheet in said supply thereof can be positioned beneath and margined by a portion of said top wall as simultaneously an interior portion of said sheet of paper or of a top sheet in said supply thereof is exposed through said opening through said top wall for reading and writing characters thereon.

And a second modification having a same usage and purpose as said first modification, shows a said writing platform comprising a base, and a said container element comprising a spaced apart and parallel extending pair of side walls projecting upwardly from said base, and an end wall projecting upwardly from said base and connecting said pair of side walls and closing one end of said container element, and a top wall overlies overall said closed one end and pair of side walls, said top wall having an opening therethrough and leading down into said container element to a portion of said base therein.

As overall shown, a said writing platform base can have a panel like thickness like a table or desk top portion and like a shelf particularly meaning a shelf in a telephone booth where a presence of my invention would be a remedy for a crying need therefor. And a portion of said writing platform base projects upwardly therefrom into said pair of side walls and an end and opposite end walls which angle into said top wall thereof all of which having a said panel like thickness as shown.

And relative to said invention, a suitable outline size of a said sheet of paper or of a said supply thereof, firstly, can be smaller than an outline size of a said portion of said writing platform base being within a container element thereof, and secondly, larger in its said outline size than a size of an interior of a top wall at its opening therethrough and leading down into its said container element, so that a said sheet of paper or a said supply thereof can be straightably curled and removably inserted into said opening and through it and flatwisely laid on a portion of said writing platform base therein, so that a margin portion of a said sheet or of a said supply thereof being within said container element can be beneath and margined by a portion of a said top wall as simultaneously an interior portion thereof is exposed through said opening through said top wall as said. And relative to each said modification, an outline side to side size of a said sheet of paper or of a said supply thereof can be smaller than an outline side to side size of a said container element, and an end to opposite end size of an instant sheet can be about the same size as same of said container element, so that a margin portion of a said sheet therein is beneath and margined by a portion of said top wall, as an interior portion of a said sheet or of a top sheet in said supply is exposed through said opening through said top wall, as said.

A top sheet of a said supply thereof within a said container element is fingered and removed therefrom as said so that a next sheet in said supply thereof becomes a new top sheet therein being similarly removable and replaced by a next sheet becoming a new top sheet therein and so on until a last sheet thereof is useable and removed therefrom when a new said supply of sheets can be removably inserted therein as said.

Drawing acompanying this specification show operable embodiments of said invention.

Figure 3:
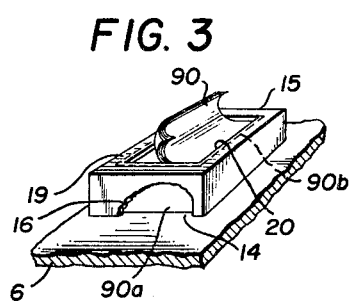
Figure 2:
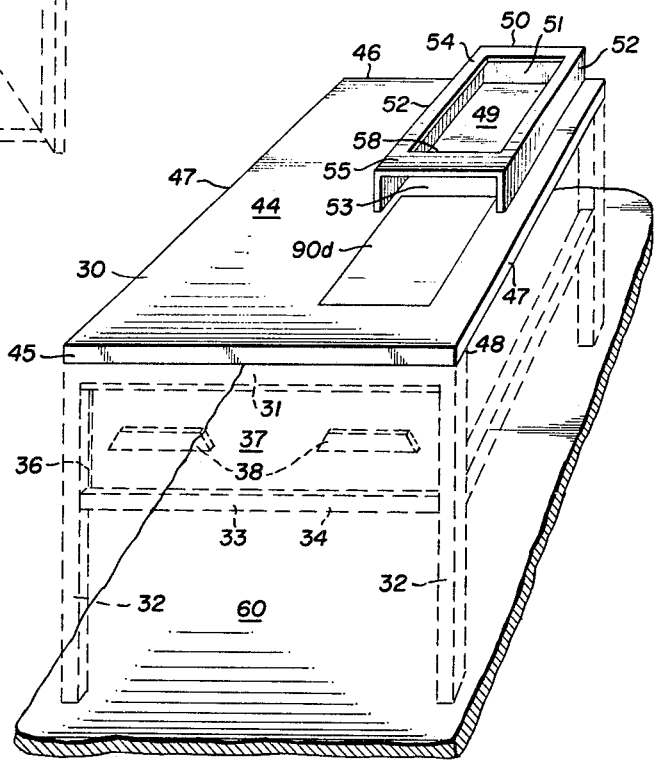

In the overall perspective views:
FIGURE 1 shows said invention within a telephone booth.
FIGURE 2 shows a modification thereof.
FIGURE 3 shows an enlarged portion of a writing platform base and its container element shown in FIGURE 1 and a supply of sheets of writing paper having been and being removably inserted through an opening through a top wall of its said container element, for being contained therein.

Figure 4:
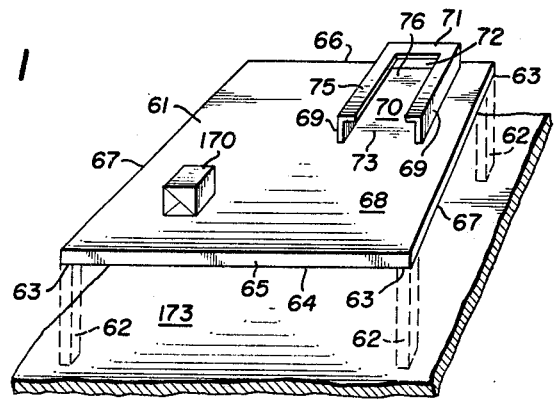

FIGURE 4 shows another modification thereof.

DESCRIPTION

FIGURE 1 shows an interior part of a known telephone booth 1 conveniently broken away from the remainder thereof. And overall in broken lines, said interior part shows a floor 2 forming into wall 3 of said booth 1, and a seat 4 on which a person can sit inside of said booth 1 while using telephoning facilities 5. And in full lines and in context, said person simultaneously can use a suitable portion of a said writing platform 6 of this invention known as a shelf 6 for removably laying a foreign object, example in FIGURE 4 at 170, thereon, and also use a container element 15 of said writing platform 6 shown projecting upwardly from a portion of a smooth top surface thereof, and shown being inwardly along and from a side edge portion thereof which could be any other portion thereof too.

And overall suitably, a horizontal portion of at least each of two opposite said walls 3 of booth 1 located a selected distance above floor 2 comprises at least a rubber strip portion 3a secured thereacross providing at least a shock absorbing means for a hereinafter used metal strip portion 3b secured across said rubber strip 3a and overall forming a part of said walls. A number of portions of said platform 6 are useable for being adapted for securing it with a said wall 3 being a means for supporting said writing platform 6 above said floor 2 in a suitably useable position shown as being horizontal, a visible secured said portion thereof being shown where a portion of said writing platform 6 is broken away to reveal a screw, enlarged in an example thereof at 12, and being driven into an screwhole for it formed through a portion of said side 11 of said writing platform 6 and aligned with an unseen screwhole for it formed at least into a portion of said metal strip 3b for securing said writing platform 6 therewith. An example of a said unseen screwhole is shown at 13.

And said writing platform 6 comprises a base 6 as said and which comprises a top 7, a bottom 8, a front 9 and a rear 10 and each of its two opposite sides 11. Said top 7 comprising a said smooth surface for removably placing a sheet of paper thereon for writing on said sheet of paper, and said base 6, top 7 comprising a portion 14 which is used as a bottom 14 of a said container element 15 thereof. Said writing platform 6 comprises a base 6 as said, and said container element 15 thereof comprises a spaced apart and parallel extending pair of side walls 18 projecting upwardly from said base 6, and a rear end wall 17 projecting upwardly from said base 6 for connecting said pair of side walls 18 and closing a rear end 17 of said container element 15, and a front end wall 16 projecting upwardly from said base 6 for connecting said pair of side walls 18 and closing a front opposite end 16 of said container element 15, and a top wall 19 integral with and overlying overall said rear end wall 17 and front opposite end wall 16 and pair of side walls 18 of said container element 15. And said top wall 19 having an opening therethrough numeraled 20 and leading down into said container element 15 to said portion of said base being a bottom 14 within said container element 15.

FIGURE 3 shows an enlarged portion of instant writing platform 6 with its said container element 15, and that a part of said front end wall 16 of said container element 15 is broken away for revealing a first part 90a of a said suitably sized supply of layered flatwisely sheets of paper layered flatwisely therein with a bottom sheet thereof on top of said portion of said base 6 being used as a bottom 14 of and within said container element 15, said first part 90a having already been hereinafter said straightably curled and removably inserted through said opening 20 through said top wall 19 for being contained therein as said. A second part 90 of said supply of sheets is said straightably curled and partly removably inserted through said opening 20 through said top wall 19 and when fully removably inserted therethrough will be layered flatwisely on top of said first part 90a thereof therein. A top sheet of a said second part 90 when contained therein would locate as shown by broken lines 90b so that it can be seen that a portion of a margin outline of a top sheet thereof therein would be beneath and margined by a portion of said top wall 19 as simultaneously an interior portion of said top sheet would be exposed through said opening 20 through said top wall 19 for a said purpose.

FIGURE 2 in full lines shows a said first modified writing platform 30 with its container element 50. Said writing platform 30 comprising a base 30 comprising a front edge 45, a rear 46 and each of two opposite sides 47, all of which suitably angling integrally into a top 44 and into a bottom 48 thereof. A portion 49 of said top 44 and said writing platform 30 simultaneously is a bottom portion 49 within said container element 50 thereof. Said container element 50 comprises a spaced apart and parallel extending pair of side walls 52 projecting upwardly from said base 30, and a rear end wall 51 projecting upwardly from said base 30 and connecting said pair of side walls 52 and closing a rear end thereof, and a top wall 54 is integral with and overlies overall said pair of side walls 52 and rear end wall 51, and also overlies across a top 55 of a paper insert end 53 of said container element 50 being without a wall thereat and being opposite to said closed rear end 51 thereof, and said top wall 54 margins an opening 58 therethrough and leading down into said container element 50 to said bottom 49 thereof therein.

A sheet of paper 90d is shown laying flatwisely on top of said writing platform 30 with a portion of said sheet of paper 90d removably inserted through said paper insert end 53 and being on top of a portion of said bottom 49 within said container element 50, said sheet of paper 90d being ready for being removably inserted all of the way through said paper insert end 53 for being entirely placed on said bottom 49 therein, for a said purpose.

And FIGURE 2 also shows said writing platform 30 comprises a number of portions being adapted for being attached with a said means 33 for positionally supporting it above a shown portion of a floor 60 as said afore. Said means 33 in broken lines has four legs 32 three of which are shown and are horizontally positioned with their bottom ends laying on said floor 60 and opposite top ends thereof attached with portions for them of said bottom 48 of said writing platform 30. And said means 33 has a horizontally positioned top 31 and a centrally located portion 34 suitably attached with and between two of said four legs 32 simultaneously for strengthening said means 33 and for forming a compartment 36 for holding a drawer 37 therein which has a pair of drawer pulls 38 attached therewith for being pulled and pushed and simultaneously opening and closing said drawer 37.

FIGURE 4 shows said second modified writing platform 61 comprising a portion at a bottom of each of its corners being useable for being adapted for securing it in an attachment thereof with a said means for supporting it above a being shown portion of a floor 173 as said. Said means 33 being four legs 62 three being visible and a fourth being unseen.

Said modified writing platform 61 and each of said four legs 62 is made from a metal which can be fused in a weld 63 so that a said bottom portion at each of its corners of said writing platform 61 is fused with a top portion of a said leg 62 so that a bottom portion of a said leg 62 lays on said floor 173.

And said writing platform 61 comprises a front 65, rear 66, and each of two opposite sides 67, all of which suitably forming into a top 68 and into a said bottom 64 thereof. And said writing platform 61 comprises a base comprising a portion 70 of said top 68 thereof which also is a bottom 70 of and within a container element 71 of said writing platform 61. Said container element 71 comprises a spaced apart and parallel extending pair of side walls 69 projecting upwardly from said base 61, and a rear end wall 72 projecting upwardly from said base 61 and connecting said pair of side walls 69 and closing a rear end 72 thereof, and a top wall 75 being integral with and overlying said rear end wall 72 and said pair of side walls 69, said top wall 75 having an opening 76 therethrough, and a numeral 73 is lined to and enclosed by a wall paper insert end of said container element 71 being opposite to said closed rear end wall 72 thereof so that a said sheet of paper as shown in said FIGURE 2 or a supply of sheets of paper as shown at 90a in said FIGURE 3 can be removably inserted through said paper insert end 73 at a front of said container element 71 and being opposite to said closed rear end wall 72 thereof for being removably placed on top of said bottom 70 within said container element 71 for a said purpose.

I claim:

1. In an article of manufacture, a writing platform comprising a base, a container element on said base, said container element comprising a pair of spaced parallel extending side walls projecting upwardly from said base, an end wall projecting upwardly from said base and connecting said side walls and closing one end thereof, a top wall overlying said closed end and side walls, and said top wall having an opening therethrough, a supply of sheets of writing paper is removably inserted through the end of the said container element opposite said closed end so that the top sheet of said paper is exposed through said opening.

2. In an article of manufacture, as defined in claim 1 and adding thereto, and an opposite end wall projecting upwardly from said base and connecting said side walls and closing an opposite end of said container element so that a said supply of sheets of writing paper is removably inserted through said opening through said top wall and into said container element so that a top sheet of said paper is exposed through said opening.

3. In an article of manufacture, as defined in claim 1, and adding thereto, a portion of said overlying top wall also overlying across a top of said paper insert end of said container element being opposite said closed end so that the top sheet of said paper is exposed through said opening.

References Cited

UNITED STATES PATENTS

| | | | |
|---|---|---|---|
| 1,465,244 | 8/1923 | Hager. | |
| 1,180,750 | 4/1916 | Wolf | 312—231 |
| 1,482,073 | 1/1924 | Ferdinand | 108—25 XR |
| 2,837,394 | 6/1958 | Rahall | 108—25 |
| 3,271,091 | 9/1966 | Henry | 108—25 XR |
| 909,547 | 1/1903 | Clark | 108—50 |
| 2,328,310 | 8/1943 | Tvrzicky | 108—50 |

BOBBY R. GAY, Primary Examiner

G. O. FINCH, Assistant Examiner